United States Patent [19]

Freck

[11] 3,866,043

[45] Feb. 11, 1975

[54] COATED PARTICLE FUEL FOR NUCLEAR REACTORS AND TO THE MANUFACTURE OF SUCH FUEL

[75] Inventor: David Vernon Freck, Stroud, England

[73] Assignee: Central Electricity Generating Board, London, England

[22] Filed: Sept. 11, 1973

[21] Appl. No.: 396,232

Related U.S. Application Data

[63] Continuation of Ser. No. 135,231, April 19, 1971, abandoned.

[30] Foreign Application Priority Data

Apr. 20, 1970  Great Britain................... 18833/70

[52] U.S. Cl............... 250/303, 176/68, 176/91 SP, 250/435
[51] Int. Cl............................ G01t 1/00, G21c 3/02
[58] Field of Search............. 176/19 LD, 68, 91 SP; 250/432, 435, 436, 302, 303

[56] References Cited
UNITED STATES PATENTS

| | | | |
|---|---|---|---|
| 2,576,616 | 11/1951 | Livingston et al............. | 176/19 LD |
| 2,996,444 | 8/1961 | Simnad................................. | 176/68 |
| 3,157,580 | 11/1964 | Williams.............................. | 176/68 |
| 3,590,247 | 6/1971 | Holford.............................. | 250/435 |
| 3,632,470 | 1/1972 | Rubin.................................. | 176/68 |
| 3,644,604 | 2/1972 | Hooker......................... | 252/301.1 R |
| 3,668,283 | 6/1972 | Moreau........................... | 176/91 SP |
| 3,769,511 | 10/1973 | Delacy............................. | 250/303 |

*Primary Examiner*—Harold A. Dixon
*Attorney, Agent, or Firm*—Edward F. Connors

[57] ABSTRACT

Particle fuel, such as is used in high temperature nuclear reactors, and having the fuel material coated with a pyrolytic carbon coating impermeable to gaseous fission products and embedded in a matrix of graphite, incorporates, for the purpose of this invention, radium 226 preferably in the binder for the grains of the fuel. The integrity of the pyrolytic carbon coating can then be checked before irradiation in a reactor by circulating an inert gas, e.g., argon, over the particles at a temperature in excess of 800°C, e.g., in the final carbonisation step during manufacture or immediately before vacuum degassing. The inert gas after passing over the particles is checked for the presence of radon 222, e.g., by passing the gas into a decay chamber having a filter in its outlet to collect radio-active solid daughters of radon and counting the alpha particles emitted by the material collected on the filter.

3 Claims, 1 Drawing Figure

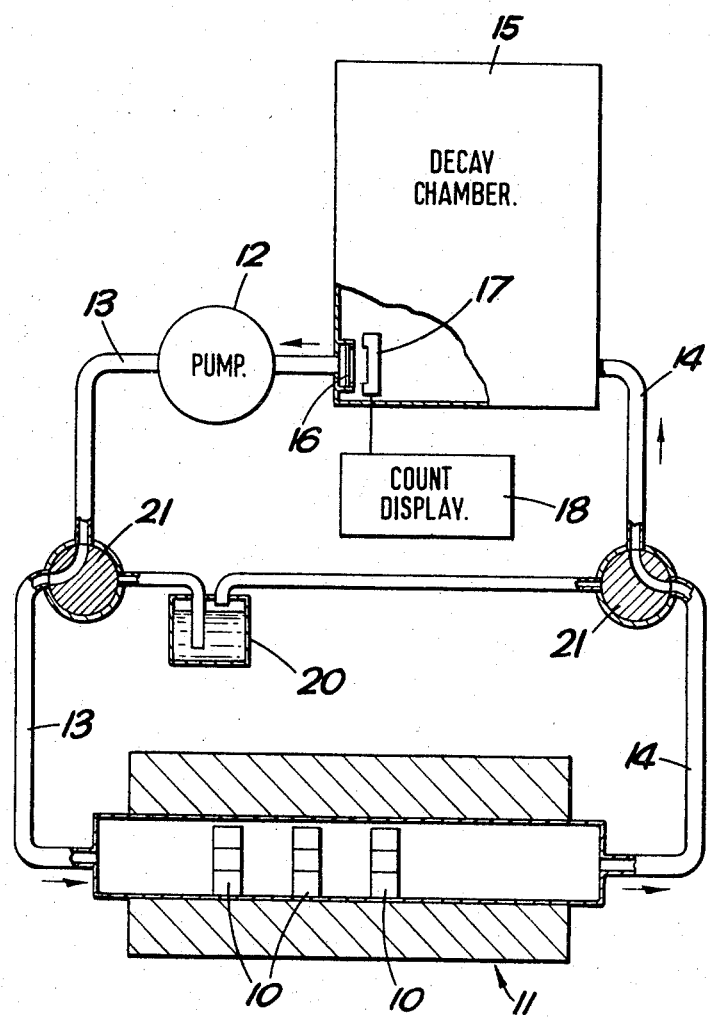

COATED PARTICLE FUEL FOR NUCLEAR REACTORS AND TO THE MANUFACTURE OF SUCH FUEL

REFERENCES TO RELATED APPLICATIONS

This application is a continuation of application Ser. No. 135,231 filed Apr. 19, 1971, and now abandoned.

BACKGROUND OF THE INVENTION

This invention relates to particle fuel (such as is used for high temperature nuclear reactors) of the kind in which the fuel material is coated with a pyrolytic carbon coating impermeable to gaseous fission products and embedded in a matrix of graphite and is concerned more particularly with the testing of such fuel particles to determine the integrity of the coating against any fission gas leakage.

In considering the problem of testing such fuel particles it will be borne in mind that these particles are quite small and that far greater numbers of fuel particles are employed in a high temperature reactor using such carbon coated fuel particles compared with the number of fuel cans in earlier types of graphite moderated gas-cooled reactors operating at lower temperatures such as the Magnox and A.G.R. reactors. There may, for example, be of the order of $10^{10}$ particles in a reactor fuel charge for a high temperature reactor and the level of defect that is required to be measured lies in a range of one in $10^4$ to one in $10^6$ fully failed particles. It is an object of the present invention to provide a method of testing such particles in a way which is directly relevant to the fission gas release in the reactor and to this standard. One of the requirements is that the testing should be effected before the particles are irradiated in the reactor. With the very large numbers of particles, it is not practicable to load them into the reactor and to check and remove faulty elements after irradiation.

In checking before irradiation, however, a further problem arises with the carbon coated fuel particles in that, although the inner pyrolytic carbon coating has to provide the effective containment of fission gas products, at low temperatures, the matrix graphite will also effectively contain such products although at high temperatures they will diffuse through this matrix graphite.

SUMMARY OF THE INVENTION

According to the present invention, in the manufacture of fuel particles for a nuclear reactor having fuel material coated with a pyrolytic carbon coating surrounded by an outer matrix graphite, there is employed a method of testing the integrity of the pyrolytic carbon coating comprising the steps of incorporating radium 226 into the fuel material and heating the particle to a temperature of at least 800°C whilst circulating an inert gas over the particles and checking the gas which has passed over said particle for the presence of radon 222. This testing might follow the completion of manufacture but very conveniently the heating for the testing may be a heating stage in the manufacture of the particles. It may, for example, be the heating during the final carbonisation step in making the fuel particles which step is normally at a temperature of 800° to 900° C. However, after this carbonisation, the particles are normally vacuum degassed at a temperature typically of the order of 1,800° C and it may be more convenient to effect the test by heating to this degassing temperature and, after effecting the test, carrying out the vacuum degassing of the particles at this temperature. The carbonisation and degassing steps may be combined by passing the particles through a furnace with two heating zones at the appropriate temperatures, e.g., at first at 900°C and the second at 1,600° C, the degassing before performed in a flowing gas stream; the testing, as before, may be effected by checking for the presence of radon in the gas stream.

The higher the temperature, the more quickly will the radon 222 diffuse through the matrix graphite. If a relatively low temperature of 800° C is employed, in order to reduce the delay to the testing process caused by the time that radon would take to diffuse out the fuel material grains of the kernel of the particle, it may be preferable to ensure that the radium is coated on the surface of these grains of the fuel material in the kernel of the particle, for example by incorporating the radium in the binder employed to bind the grains together during the kernel manufacture and sintering process. As examples of suitable binding materials, a paraffin or ketone binder may be employed but preferably a mixture of radium stearate and aluminium stearate is employed as the binder. The amount of radium required to be incorporated in the particles is very small. Systems have been built to detect quantities of radon as small as $10^{-14}$ Curies (which give only one to two disintegrations per hour). The quantity of radium to be added to fuel is governed not therefore by the limits of detection techniques but by the time in which it is required to conduct the test and the limitations of convenient detection techniques. The amount of radium required is very small, typically less than 1 part in $10^8$ parts of uranium (by weight), and should not cause any difficulty in the manufacturing process if the ventilation is adequate.

The invention furthermore includes within its scope a nuclear reactor fuel particle of the kind in which the fuel material is coated with a pyrolytic carbon coating and with an outer matric graphite coating wherein a small quantity of radium 226 is incorporated in the fuel material. For a uranium fuel, the radium may be less than 1 part in $10^8$ parts (by weight) of the uranium. It may be coated on the grains of the fuel material or incorporated in a binder for the fuel material grains.

The fuel material in the particles is typically uranium oxide or a mixture of uranium and thorium oxide. Other materials however may be employed, e.g., uranium carbide.

The invention also includes within its scope apparatus for testing nuclear reactor fuel particles of the above-described kind in which the fuel material has a pyrolytic carbon coating and is embedded in a matrix of graphite and incorporates radium 226, which apparatus comprises means for heating the fuel particles in a closed furnace to a temperature of at least 800° C, means for circulating an inert gas through the furnace and through a decay chamber having, in its exit, a filter for collecting radio active solid daughters of radon, and means for checking the presence of any such radio active material on the filter. The checking is preferably effected by means of a counter counting any alpha particles emitted by the material collected on the filter.

It is desirable to check the amount of radium in the fuel before looking for radon release. The radium in the fuel may be measured by gamma ray spectroscopy. However, to obviate the need to wait for the radon to come into equilibrium with the radium (radon 222 has a half-life of 3.8 days), the quantity of radon daughters in the fuel may be checked by gamma ray spectroscopy before looking for radon release.

For calibration purposes, a secondary loop containing a known radon source may be provided, the gas being circulated through the radon source and decay chamber. The source conveniently is a solution of a known quantity of radium chloride in hydrochloric acid to give a pH of about 2, the gas being bubbled through the solution to release the radon.

The above-described method and apparatus provides a non-destructive test technique to check the integrity of the particle coatings against release of gaseous fission product and it has a particular advantage in that the test can be carried out if desired after the particles have been compacted.

BRIEF DESCRIPTION OF THE DRAWING

The accompanying drawing illustrates diagrammatically an apparatus for testing the integrity of the pyrolytic carbon coating of nuclear fuel particles.

DESCRIPTION OF THE PREFERRED EMBODIMENT

The manner of making fuel particles for high temperature gas-cooled reactors is well-known and may be outlined as follows, mention being made only of the features of significance in relation to the testing of the integrity of the coating and to the novel steps in the manufacture for this purpose. The particles have an inner kernel of compacted powdered fuel material, usually uranium oxide although other materials, e.g., uranium carbide or mixed oxides or carbides may be employed. The grains of the material are bound together with a binder and it is preferred for the present purposes to use a mixture of radium stearate and aluminium stearate as the binder. It is desirable that the kernel should be porous and this may be achieved by making the kernel of $U_3O_8$ and subsequently reducing it to $UO_2$ after binding the grains together with the binder. By this technique the surface of the grains has a coating containing radium. Around the kernel is a layer of pyrolytic carbon which has to provide the effective containment of fission gas products at the operating temperatures in the reactor. Outside the pyrolytic carbon layer, possibly over an intermediate layer, is an outer coating of matrix graphite which is formed by a carbonisation process at a temperature of 800° to 900° C. In manufacturing the particles, after this carbonisation, are heated to a temperature typically of 1,800° C and then vacuum degassed.

The testing apparatus shown in the drawing for testing compacts 10 includes a closed tubular furnace 11 which is the furnace either for heating and compacts for the carbonisation process or the furnace for heating the particles prior to degassing. By means of a pump 12, an inert gas is circulated through a pipe 13 into the furnace and out through a pipe 14 to a decay chamber 15. This inert gas (which may be any gas which will not react with the particles or the material of the equipment) will carry with it any radon 222 which escapes from the fuel particles on heating. This radon decays in the decay chamber 15 and the radio active solid daughters of the radon are filtered at the exit of the chamber by a filter 16 (conveniently a cellulose acetate type filter) and their presence on the filter is checked by means of an alpha particle counter 17 (e.g., a solid state silicon surface barrier detector) which counts alpha particles emitted by the material collected on the filter, the count being shown on a display 18. Any escape of radon indicates faults in the pyrolytic carbon coating and hence the counter indication provides a measure of the proportion of faulty coatings in the particles under test.

For calibration purposes, there is provided a known radon source comprising a vessel 20 containing a known quantity of radium chloride in an aqueous solution with sufficient hydrochloric acid to give a pH of about 2; the hydrochloric acid is to keep the radium chloride in solution. By means of valves 21, the gas stream can be diverted to bubble through the radium chloride solution to release the radon. For calibration, the gas passes through the vessel 20 and into the decay chamber 15 where the radon decays and is measured by the counter 17.

It is desirable to check the quantity of radium in the fuel particles before looking for radon release. This may be done by gamma ray spectroscopy. As a refinement, the quantity of radon daughters may also be checked by gamma ray spectroscopy; this obviates the need to wait until the radon has come into equilibrium with the radium.

I claim:

1. In the manufacture of fuel bodies for a nuclear reactor having fuel particles of compacted powdered fuel material coated with a pyrolytic carbon coating and without metal cladding but surrounded by an outer matrix graphite, a method of testing the integrity of the pyrolytic carbon coating prior to irradiation in a reactor comprising the steps of incorporating radium 226 into the fuel material, heating the fuel bodies in a furnace to a temperature of at least 800° C without irradiation whilst circulating an inert gas through the furnace to pass over the matrix graphite surface of the fuel bodies and checking the gas which has passed over said fuel bodies for the presence of radon 222.

2. A method of testing as claimed in claim 1 wherein the presence of radon 222 is checked by passing the gas into a decay chamber having a filter at its outlet to collect the radio-active solid daughters of radon and counting the alpha particles emitted by the material collected on the filter.

3. A method of testing as claimed in claim 1 wherein the quantity of radium in the fuel is checked by gamma ray spectroscopy before looking for radon release.

* * * * *